(12) United States Patent
Dahir et al.

(10) Patent No.: US 10,733,575 B2
(45) Date of Patent: Aug. 4, 2020

(54) AUTOMATIC GENERATION OF RESERVATIONS FOR A MEETING-SPACE FOR DISTURBING NOISE CREATORS

(71) Applicant: Cisco Technology, Inc., San Jose, CA (US)

(72) Inventors: Hazim Hashim Dahir, Raleigh, NC (US); Aamer Saeed Akhter, Cary, NC (US); Jazib Frahim, Cary, NC (US); Haseeb Sarwar Niazi, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 323 days.

(21) Appl. No.: 15/615,176

(22) Filed: Jun. 6, 2017

(65) Prior Publication Data

US 2018/0349857 A1 Dec. 6, 2018

(51) Int. Cl.
| | |
|---|---|
| *G06Q 10/10* | (2012.01) |
| *G06Q 10/02* | (2012.01) |
| *G10L 15/02* | (2006.01) |
| *G10L 25/78* | (2013.01) |
| *G10L 17/00* | (2013.01) |

(52) U.S. Cl.
CPC ......... *G06Q 10/1095* (2013.01); *G06Q 10/02* (2013.01); *G10L 15/02* (2013.01); *G10L 25/78* (2013.01); *G10L 17/00* (2013.01); *G10L 2025/783* (2013.01)

(58) Field of Classification Search
CPC .... G06Q 10/1095; G06Q 10/02; G10L 15/02; G10L 25/78; G10L 17/00; G10L 2025/783
See application file for complete search history.

(56) References Cited

U.S. PATENT DOCUMENTS

| | | | |
|---|---|---|---|
| 7,956,890 B2 | 6/2011 | Cheng et al. | |
| 7,982,609 B2* | 7/2011 | Padmanabhan | H04Q 9/00 235/385 |
| 8,195,598 B2 | 6/2012 | Hua et al. | |
| 8,369,967 B2 | 2/2013 | Hoffberg et al. | |
| 8,799,048 B2* | 8/2014 | Bisht | G06Q 10/109 705/7.19 |
| 8,842,496 B2* | 9/2014 | Vartanian | G01S 15/08 367/128 |
| 9,355,530 B1* | 5/2016 | Block | G07F 19/201 |
| 9,407,738 B2 | 8/2016 | Geiger et al. | |

(Continued)

OTHER PUBLICATIONS

Claudia Pateras, "A Mixed-initiative natural dialogue system for conference room reservation", published by ISCA Archive, in 1999, all pages (Year: 1999).*

*Primary Examiner* — Kevin H Flynn
*Assistant Examiner* — Omar Zeroual
(74) *Attorney, Agent, or Firm* — Behmke Innovation Group LLC; Kenneth J. Heywood; James J. Wong

(57) ABSTRACT

In one embodiment, a supervisory device in a network, configured to interact with one or more sensors positioned in a given area and with a conference room scheduling service, obtains an acoustic feature of the area from one or more of the sensors. The supervisory device makes a determination that a conference room should be reserved based on the acoustic feature and selects a particular conference room based on the determination that a conference room should be reserved. The supervisory device instructs a conference room scheduling service to reserve the particular conference room.

17 Claims, 5 Drawing Sheets

(56) References Cited

U.S. PATENT DOCUMENTS

| | | | | |
|---|---|---|---|---|
| 9,513,739 B2* | 12/2016 | Herz | | G09G 3/3406 |
| 9,672,472 B2* | 6/2017 | Snyder | | G06F 19/00 |
| 9,852,388 B1* | 12/2017 | Swieter | | G06Q 10/06313 |
| 9,921,726 B1* | 3/2018 | Sculley | | H04L 67/12 |
| 10,161,752 B1* | 12/2018 | Poel | | G01S 5/14 |
| 2003/0004772 A1* | 1/2003 | Dutta | | G06Q 10/02 |
| | | | | 718/100 |
| 2005/0213739 A1* | 9/2005 | Rodman | | H04M 3/567 |
| | | | | 379/202.01 |
| 2006/0100866 A1* | 5/2006 | Alewine | | G10L 15/22 |
| | | | | 704/226 |
| 2007/0162315 A1* | 7/2007 | Hodges | | G06Q 10/02 |
| | | | | 705/7.12 |
| 2008/0159547 A1* | 7/2008 | Schuler | | G01H 3/14 |
| | | | | 381/56 |
| 2008/0162198 A1* | 7/2008 | Jabbour | | G06Q 10/02 |
| | | | | 705/5 |
| 2008/0194928 A1* | 8/2008 | Bandic | | G16H 15/00 |
| | | | | 600/306 |
| 2009/0112926 A1* | 4/2009 | Parker, II | | H04L 12/66 |
| 2010/0070314 A1* | 3/2010 | Jethani | | G06Q 10/02 |
| | | | | 705/6 |
| 2010/0292961 A1* | 11/2010 | Moss | | G01D 4/002 |
| | | | | 702/188 |
| 2011/0157366 A1* | 6/2011 | Padmanabh | | H04N 7/15 |
| | | | | 348/159 |
| 2012/0052872 A1* | 3/2012 | Do | | G01S 5/18 |
| | | | | 455/456.1 |
| 2012/0075068 A1* | 3/2012 | Walker | | G06Q 10/109 |
| | | | | 340/10.1 |
| 2012/0179502 A1* | 7/2012 | Farooq | | G06Q 10/06311 |
| | | | | 705/7.13 |
| 2012/0185291 A1* | 7/2012 | Ramaswamy | | H04L 12/1818 |
| | | | | 705/7.19 |
| 2012/0203579 A1* | 8/2012 | Glasson | | G06Q 10/02 |
| | | | | 705/5 |
| 2012/0297304 A1* | 11/2012 | Maxwell | | H04M 1/72569 |
| | | | | 715/728 |
| 2013/0047175 A1* | 2/2013 | Ramirez Flores | | H04H 60/45 |
| | | | | 725/12 |
| 2013/0091440 A1* | 4/2013 | Kotler | | G06Q 10/10 |
| | | | | 715/753 |
| 2013/0150117 A1* | 6/2013 | Rodriguez | | G06K 9/00892 |
| | | | | 455/550.1 |
| 2013/0331087 A1* | 12/2013 | Shoemaker | | H04W 4/023 |
| | | | | 455/420 |
| 2014/0004492 A1* | 1/2014 | O'Reilly | | G06F 19/3456 |
| | | | | 434/236 |
| 2014/0046659 A1* | 2/2014 | Burton | | G10L 25/48 |
| | | | | 704/226 |
| 2014/0046716 A1* | 2/2014 | Black | | G06Q 10/06314 |
| | | | | 705/7.19 |
| 2014/0149592 A1* | 5/2014 | Krishna | | G06F 1/329 |
| | | | | 709/226 |
| 2014/0155705 A1* | 6/2014 | Papadopoulos | | A61B 5/0022 |
| | | | | 600/301 |
| 2014/0201120 A1* | 7/2014 | Lydon | | G06F 21/316 |
| | | | | 706/46 |
| 2014/0229575 A1* | 8/2014 | Yamahara | | G06Q 10/06 |
| | | | | 709/217 |
| 2014/0229866 A1* | 8/2014 | Gottlieb | | H04L 65/403 |
| | | | | 715/758 |
| 2014/0257883 A1* | 9/2014 | Thompson | | G06Q 10/02 |
| | | | | 705/5 |
| 2014/0297526 A1* | 10/2014 | Martin | | G06Q 20/1085 |
| | | | | 705/42 |
| 2014/0310630 A1* | 10/2014 | Asikainen | | G01C 21/206 |
| | | | | 715/771 |
| 2015/0039357 A1* | 2/2015 | Segal | | G06Q 10/06314 |
| | | | | 705/5 |
| 2015/0128293 A1* | 5/2015 | Hitomi | | H04L 65/60 |
| | | | | 726/29 |
| 2015/0142895 A1* | 5/2015 | Beran | | H04L 51/04 |
| | | | | 709/206 |
| 2015/0154521 A1* | 6/2015 | Mu | | H04L 12/1818 |
| | | | | 705/7.12 |
| 2015/0156231 A1* | 6/2015 | Noisette | | H04L 12/1818 |
| | | | | 709/204 |
| 2015/0179012 A1* | 6/2015 | Sharpe | | G07C 9/00904 |
| | | | | 340/5.28 |
| 2015/0193739 A1* | 7/2015 | Min | | G06Q 10/1095 |
| | | | | 705/7.19 |
| 2015/0331395 A1* | 11/2015 | Hepperla | | G05B 11/01 |
| | | | | 700/9 |
| 2015/0338117 A1* | 11/2015 | Henneberger | | G05B 15/02 |
| | | | | 700/276 |
| 2015/0350807 A1* | 12/2015 | Andrews | | G06F 9/542 |
| | | | | 455/414.2 |
| 2015/0379400 A1* | 12/2015 | Tatourian | | H04L 67/22 |
| | | | | 706/46 |
| 2016/0066393 A1* | 3/2016 | Bosua | | H05B 45/20 |
| | | | | 315/307 |
| 2016/0112681 A1* | 4/2016 | Kaestle | | A61B 5/0077 |
| | | | | 348/78 |
| 2016/0170998 A1 | 6/2016 | Frank et al. | | |
| 2016/0180259 A1* | 6/2016 | Marianko | | H04N 7/147 |
| | | | | 705/5 |
| 2016/0227361 A1* | 8/2016 | Booth | | H04W 4/029 |
| 2016/0285785 A1* | 9/2016 | Thye | | H04L 47/822 |
| 2016/0295658 A1* | 10/2016 | Chraibi | | H05B 47/19 |
| 2016/0342950 A1* | 11/2016 | Pignataro | | G06Q 10/1095 |
| 2017/0007928 A1* | 1/2017 | Middleton | | A63F 13/12 |
| 2017/0161646 A1* | 6/2017 | Abuelsaad | | G06F 16/29 |
| 2017/0372411 A1* | 12/2017 | Kolegraff | | G06Q 20/14 |
| 2018/0007467 A1* | 1/2018 | Goran | | H04L 12/2827 |
| 2018/0082263 A1* | 3/2018 | Michels | | H04L 67/18 |
| 2018/0139253 A1* | 5/2018 | Ruetschi | | H04L 65/1076 |
| 2018/0150927 A1* | 5/2018 | Rickey | | G06Q 10/06311 |
| 2018/0152487 A1* | 5/2018 | Griffin | | H04L 12/1818 |
| 2018/0176100 A1* | 6/2018 | Marie | | H04L 41/5051 |
| 2018/0253666 A1* | 9/2018 | Fix | | G06Q 10/02 |
| 2018/0299843 A1* | 10/2018 | Ray | | G05B 15/02 |
| 2019/0158309 A1* | 5/2019 | Park | | H04L 12/2809 |
| 2019/0281262 A1* | 9/2019 | Ryan | | G06K 9/00771 |

\* cited by examiner

US 10,733,575 B2

AUTOMATIC GENERATION OF RESERVATIONS FOR A MEETING-SPACE FOR DISTURBING NOISE CREATORS

TECHNICAL FIELD

The present disclosure relates generally to computer networks, and, more particularly, to the automatic generation of reservations for a meeting-space for disturbing noise creators.

BACKGROUND

In many office environments, it is not unusual for groups of coworkers to congregate either outside of individual offices or within larger open office spaces (hallways, coffee rooms, etc.), having side conversations and so-called "water-cooler" discussions. While short, quick conversations may not be a significant problem in the work environment, it is not uncommon for these informal discussions to become longer in duration, sometimes including additional participants as the conversations progress. These groups may often create disturbances for neighboring individuals or groups attempting to work, creating pockets of noise that can be distracting to employees and reducing overall work productivity. In addition, some conversations may include private or confidential information not appropriate for others to hear. This is particularly true in work environments that include large open work spaces, cubicle areas, and offices without doors, which are designed to create an open and collaborative atmosphere, but also produce localized group discussions that can interfere with the work of those not participating.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
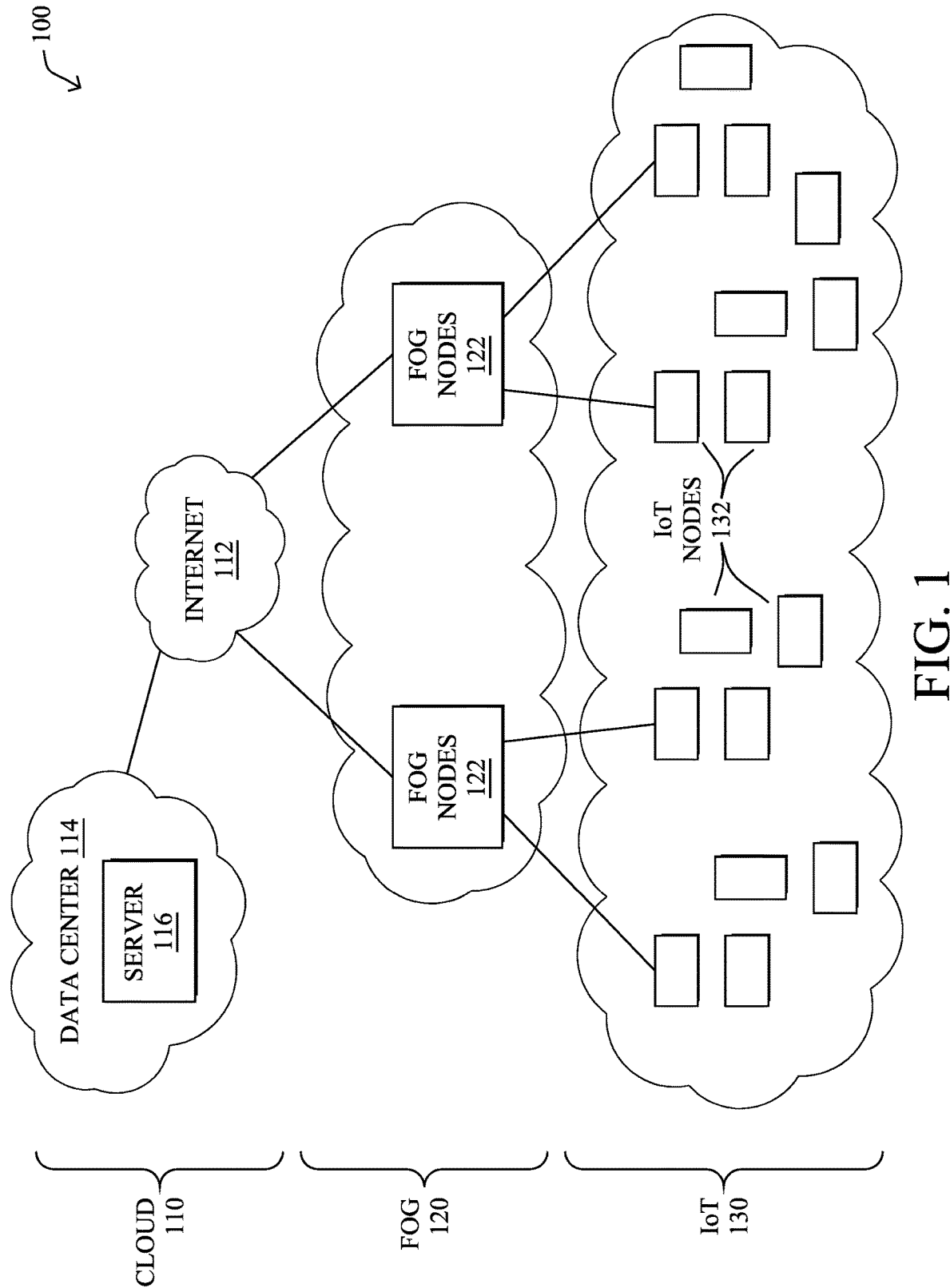
FIG. 1 illustrates an example communication network.

According to one or more embodiments of the disclosure, a supervisory device in a network, configured to interact with one or more sensors positioned in a given area and with a conference room scheduling service, obtains an acoustic feature of the area from one or more of the sensors. The supervisory device makes a determination that a conference room should be reserved based on the acoustic feature and selects a particular conference room based on the determination that a conference should be reserved. The supervisory device instructs a conference room scheduling service to reserve the particular conference room.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
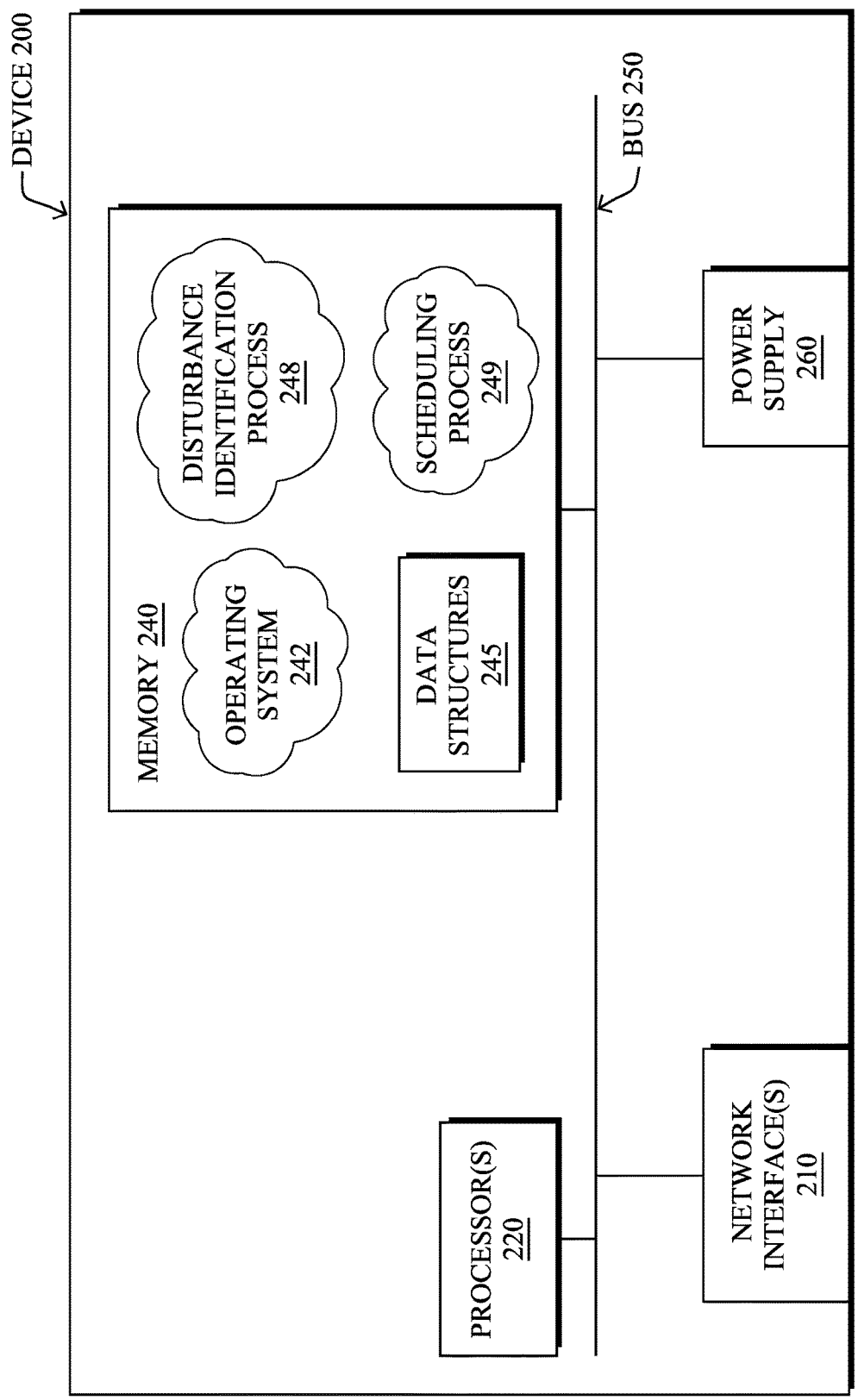
FIG. 2 illustrates an example network device.

FIG. 2 is a schematic block diagram of an example node/device 200 that may be used with one or more embodiments described herein, e.g., as any of the computing devices shown in FIG. 1, particularly the IoT nodes/sensor(s) 132, fog computing nodes 122 and/or servers 116, or any other computing device that supports the operations of communication network 100 (e.g., routers, access points, switches, etc.), or any of the other devices referenced below. In general, device 200 may include one or more network interfaces 210, one or more processors 220, and a memory 240 interconnected by a system bus 250 and powered by power supply 260.

The network interfaces 210 may include the mechanical, electrical, and signaling circuitry for communicating data over wireless and/or wired links of communication network 100 (e.g., any number of ports, transceivers, antennas, etc.). The network interfaces may be configured to transmit and/or receive data using a variety of different communication protocols. For example, in one embodiment, network interface(s) 210 may include a wireless interface that supports Wi-Fi, cellular, or other wireless technologies to connect device 200, to a nearby Wi-Fi network, 3 G/4 G cellular data network, or the like. In another embodiment, network interface(s) 210 include an interface for a hardwired network connection such as a 100 Mb/s Power over Ethernet (PoE) port. This not only provides data interconnect, but can also provide the power needed to run the device over the same physical cable, feeding energy into power supply 260. In another embodiment, network interface(s) 210 may include a near-field communication interface that uses Bluetooth or any of the emerging IoT wireless options, to communicatively connect to any other nearby device.

The memory 240 comprises a plurality of storage locations that are addressable by the processor(s) 220 and network interfaces 210 for storing software programs and data structures associated with the embodiments described herein. Note that certain devices may have limited memory or no memory (e.g., no memory for storage other than for programs/processes operating on the device and associated caches). Processor 220 may comprise necessary elements or logic adapted to execute the software programs and manipulate the data structures 245. Operating system 242, portions of which is typically resident in memory 240 and executed by the processor(s), functionally organizes data by, among other things, invoking operations in support of software processors and/or services executing on the device. Illustratively, these software processors and/or services may include disturbance identification process 248 and scheduling process 249, that are configured to perform the operations as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, disturbance identification process 248 includes computer executable instructions that, when executed by processor(s) 220, may be operable to perform identification of one or more acoustic features of a given area and, in some embodiments, to perform identification of characteristics of the source(s), as described in more detail below. In addition, scheduling process 249, when executed, may be operable to determine availability of nearby meeting spaces and reserve such spaces as needed, based on one or more of the acoustic features, as described in more detail below. During operation, disturbance identification process 248 and/or scheduling process 249 may also use cloud computing techniques (e.g., centralized processing from one or more remote servers) or fog computing techniques (e.g., extending the cloud computing paradigm to the edges of the network) to, for example, coordinate activity between the components of each system. Generally, one or more sensors may be configured with disturbance identification process 248, and a room scheduling service may be configured to operate scheduling process 249. A supervisory device, such as server(s) 108, on the other hand, may be configured with both processes 248/249 (e.g., a single process or multiple processes) to identify acoustic features and/or source(s) within a given area and to select a particular meeting space if needed or appropriate.

As noted above, it is not unusual for groups of coworkers to gather together for impromptu conversations in open spaces within an office environment. For example, two individuals passing in a hallway may stop to discuss various issues informally. In some cases, small, quick gatherings may grow larger and/or longer depending on the location and the topic. In addition, some unscheduled conversations may include private or confidential information that can inadvertently be overheard by those in nearby workspaces. Such informal gatherings can often become a distraction to individuals in nearby offices, and, as a result, overall productivity of the work environment may be significantly impacted, particularly for offices using an open space design intended to foster collaboration through employee interactions.

To avoid disturbing nearby people, a conversation participant may transition the conversation away from the nearby individuals. However, in general, the individuals participating in the conversations are often not aware that they are creating disturbances for surrounding individuals or groups attempting to work. In addition, many of these conversations start with the intention of being quick, but often end up lasting longer than anticipated. Furthermore, the availability of nearby meeting rooms is generally not always known to the participants of impromptu conversations.

Automatic Generation of Reservations for a Meeting-Space for Disturbing Noise Creators The techniques herein provide for the sensing and identification of various acoustic features, such as noise level and duration, in a given area, as well as the selecting of available meeting rooms based on a determination that a room should be used. In particular, a system is described that may utilize sensor fusion to combine data from multiple sensors (microphones, cameras, etc.) in order to detect and identify acoustic disturbances in a specified work area, determine the individual or group of individuals that are participating and therefore contributing to the disturbances, and to select and reserve a meeting space where the discussion can be relocated and continued without distracting those around the work area. In this way, the techniques may provide improvements in work productivity and efficiency, particularly for open work flow office spaces (e.g., "office neighborhoods") designed to create large spaces intended to encourage innovation or incubation environments for employee collaboration.

Specifically, according to one or more embodiments of the disclosure as described in detail below, a supervisory device in a network, configured to interact with one or more sensors positioned in a given area and with a conference room scheduling service, obtains an acoustic feature of the area from one or more of the sensors. The supervisory device makes a determination that a conference room should be reserved based on the acoustic feature and selects a particular conference room based on the determination that a conference room should be reserved. The supervisory device instructs a conference room scheduling service to reserve the particular conference room.

Illustratively, the techniques described herein may be performed by hardware, software, and/or firmware, such as in accordance with the disturbance identification process 248 and the scheduling process 249, which may include computer executable instructions executed by the processor 220 (or independent processor of interfaces 210) to perform functions relating to the techniques described herein, e.g., in conjunction with routing process 244.

Figure 3:
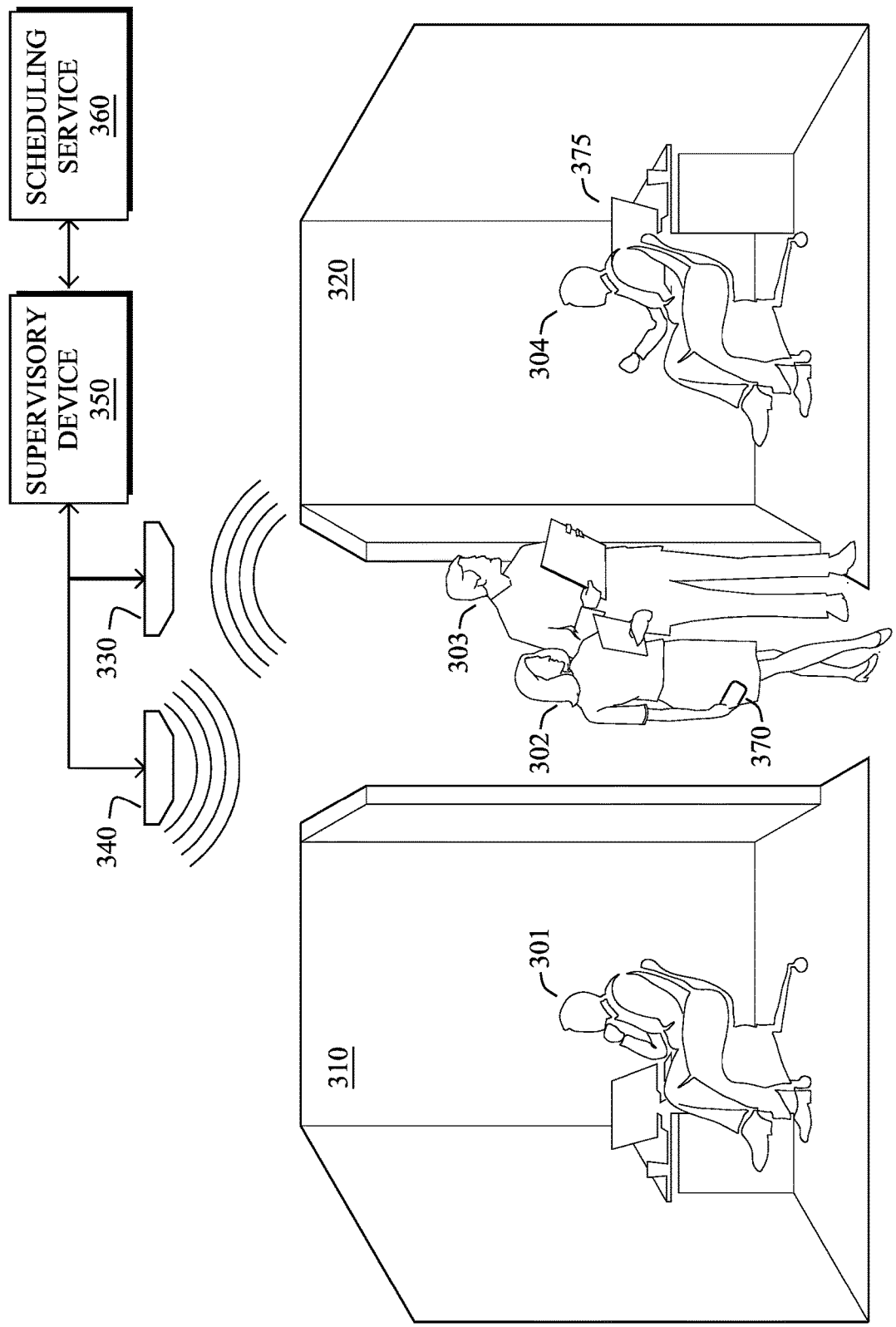
FIG. 3 illustrates an example room scheduling based on acoustic detection and identification within an office environment.

Operationally, FIG. 3 illustrates various aspects of the identification and scheduling techniques described herein. As generally shown, employee 301 may be at work in work space 310 while, nearby, in work space 320, employees 302, 303, and 304 may be engaged in a conversation that could significantly impact the productivity and efficiency of employee 301. According to some embodiments of the present disclosure, an identification system may be used to determine whether the conversation is or may become excessively distracting and should therefore be moved to a nearby available conference room, based on the measured acoustic features.

In particular, as shown, an identification system may include one or more sensors 330, which may determine that employees 302 and 303 have congregated in an area outside of office space 320 for a conversation. The sensor(s) 330 may include, for example, an acoustic sensor, such as a microphone, and/or a visual sensor, such as a camera or motion detector. Other sensors may also be used. Sensor(s) 330 may, in some embodiments, sense one or more acoustic features of the area, including, for example, sound levels (dB), frequencies, duration, or combinations thereof. Assessing that disturbing noise exists may also include factors configured to distinguish various sound types, in order to eliminate, for example, white-noise or motor vehicle traffic noise that is passing by and therefore not continuous. In this way, an acoustic conversation may be recognized and the "disturbance" level assessed in order to determine if any action needs to be taken to remove the "noise-makers" from the space.

The acoustic feature(s) may be received by supervisory device 350, which may be configured to interact with the sensor(s) and with scheduling service 360. The supervisory device may make a determination of whether a conference room or other meeting space should be scheduled for the conversing employees, particularly based on the acoustic features provided by the sensor(s). For example, sensor(s) 330 may be an acoustic sensor configured to measure noise levels over time, and supervisory device 350 may determine that the measured levels and/or duration received from the sensor(s) are greater than a threshold level (e.g., the conversation is too loud and/or has been going on for too long), from which the supervisory device may determine that a room is needed.

Based on the received acoustic features, supervisory device 350 may select one or more particular locations into which the conversation may be moved. For example, one or more sensors 340 may be used to identify the location of the conversation, from which supervisory device may determine nearby available conference room spaces. Furthermore, one or more of the sensors may also be configured to determine various identifying characteristics of the employee(s) (e.g., facial features, voice patterns, ID tag number, etc.) in order to assess crowd size to determine a suitable meeting space for the number of employees present. Identifying characteristics may also enable the supervisory device to provide a notification and/or alert to one or more of the participating employees, such as through mobile device 370 or computer 375 (e.g., via text or email), to indicate, for example, that a nearby room has been made available.

Figure 4:
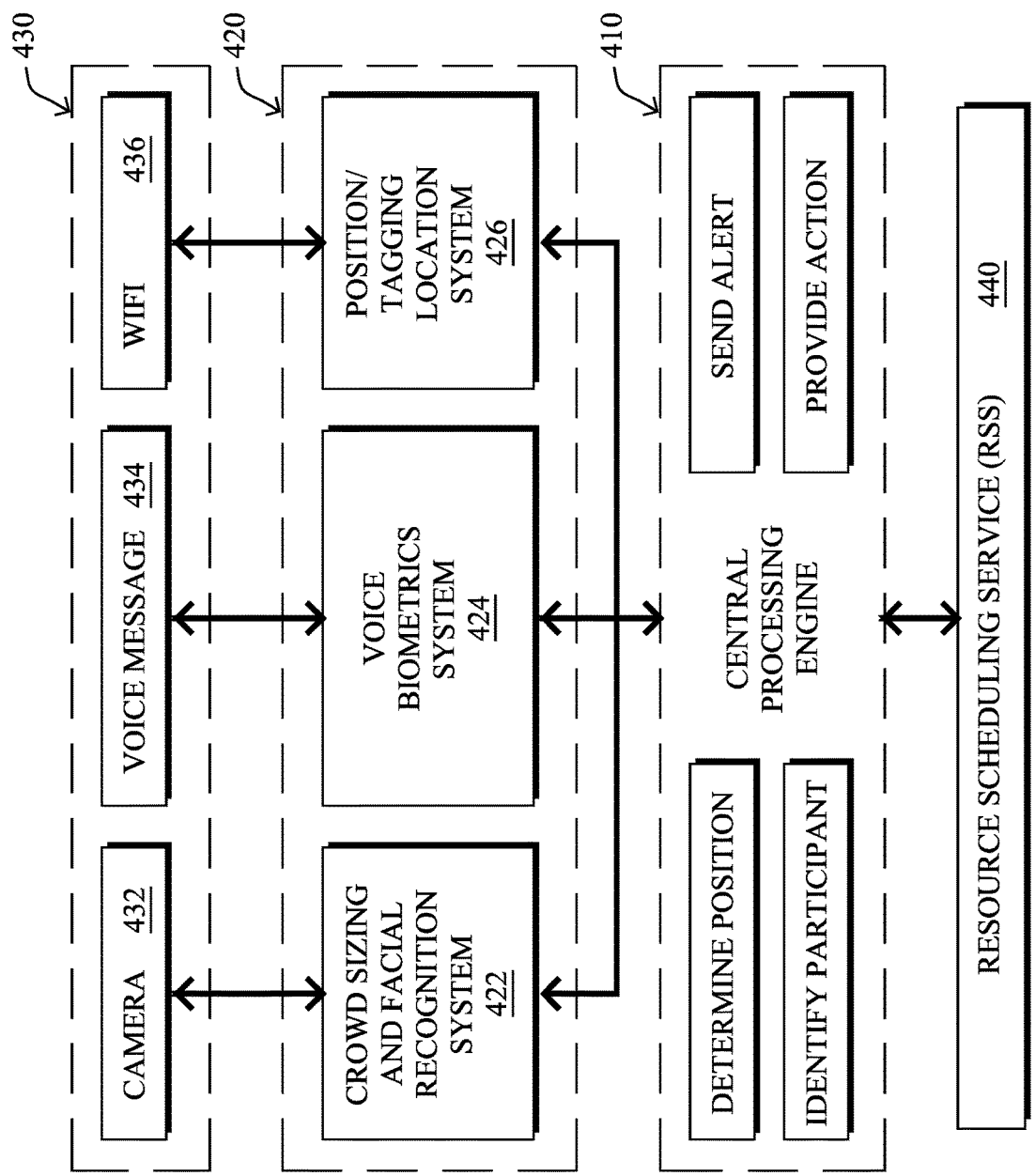
FIG. 4 illustrates an example architecture for room scheduling based on acoustic detection and identification.

FIG. 4 illustrates an embodiment of an architecture for reserving a meeting space to mitigate disturbances. In general, architecture 400 includes a data source layer 430, a data analytics layer 420, a central processing engine layer 410 (e.g., disturbance identification process 248) and a resource scheduling service (RSS) layer 440 (e.g., scheduling process 249). As would be appreciated, each layer of architecture 400 may be implemented on a single device or, alternatively, in a distributed manner. For example, As shown, central processing engine 410 may be configured to interact with one or more identity assessment systems in analytics layer 420, in order to determine identifying characteristics of the acoustic feature of a disturbance. For example, central processing engine 410 may interact with crowd sizing and facial recognition system 422, voice biometrics system 424, and/or position/tagging location system 426, as well as other available systems for assessing the acoustic feature (e.g., the source of the noise disturbance). By way of further example, assume that central processing engine 410 receives data indicative of a disturbance (e.g., noise over a predefined threshold, a head count of people in a common area, etc.). In such a case, central processing engine 410 may communicate with analytics layer 420, to determine the position/location of the disturbance and identify the participant(s) in the disturbance. Analytics layer 420 may interact with one or more sensors/devices in data source 430, in order to determine specific features needed by each system in layer 420, to enable the central processing engine 410 to characterize the acoustic feature and provide a suitable meeting space, if needed. The sensors/device 430 may be used individually or in fusion to determine the disturbance source, size, and location (i.e., using a data fusion technique).

By way of example of the interaction between layers 420 and 430, crowd sizing and facial recognition system 422 may be in communication with camera 432 to obtain visual features that can be used to assess the source and/or location of the source. Where available and applicable, a physical security type camera may be used to identify that a crowd of a specific size exists in proximity to a specific disturbance sensors so that resources may be selected that can accommodate the crowd. Furthermore facial recognition features may be used to identify specific individuals within the crowd in order to, for example, provide room availability notifications.

Voice biometrics system 424 may provide voice fingerprinting or other voice identification capabilities. For example, many employees record and store a voice message for their voice-mail system. Analysis of stored voice message 434 allows a voice recognition system to produce a voice-ID, which can be created based on several unique identifiers in a person's voice such as cadence, accent, pronunciation, and sounds that indicate the shape and size of the larynx, nasal passages and vocal tract. The central processing engine 410 may compare these acoustic features, received from one or more acoustic sensors (not shown), with stored voice-IDs created by voice biometrics system 424 in order to determine the identity of individual(s) within the crowd that are related to the acoustic features (e.g., source of the sound). The acoustic sensors may be required to capture a sound sample that is very short and/or a sporadic and non-continuous yet are sufficient to generate an ID from voice-biometrics without infringing on individual privacy.

Position/tagging location system 426 may include a real time location service (RTLS) to identify an individual among the source of the noise disturbance. Other hyper-location technologies may also be used, such as those based on a tag or button (e.g. an ID badge) worn by the employee. A signal may be received from the tag by one or more of the sensors, which may be used to identify a participating employee. In addition, location system 426 may use a participants own smart-devices to determine their location. For example, individuals who are the source of the acoustic feature received from one or more of the sensors may be identified based on an association of their mobile device with a computer network, such as Wi-Fi 436, via a wireless access point.

Central processing engine may further be configured to interact with resource scheduling service (RSS) 440 in order to determine room availability/accessibility and to reserve an appropriate room. For example, in some embodiments, based on a determination that a conference room should be scheduled from measured acoustic feature(s), central processing engine 410 may determine the position of the source of the acoustic feature(s) using one or more identity assessment systems in layer 420, and, based on the identified characteristics (e.g., location, estimation of crowd size, identities of participants), select and reserve an available meeting space via RSS layer 440 (e.g., an Exchange service, a collaboration meeting room scheduler, etc.) that can accommodate the crowd. In addition, a notification may be sent to one or more of the participating individuals to alert them to move their conversation to the newly assigned space. For example, central processing engine 410 may instruct RSS service layer 440 to send a notification to an end device associated with one of the participants of a detected disturbance and/or send the alert directly.

Figure 5:
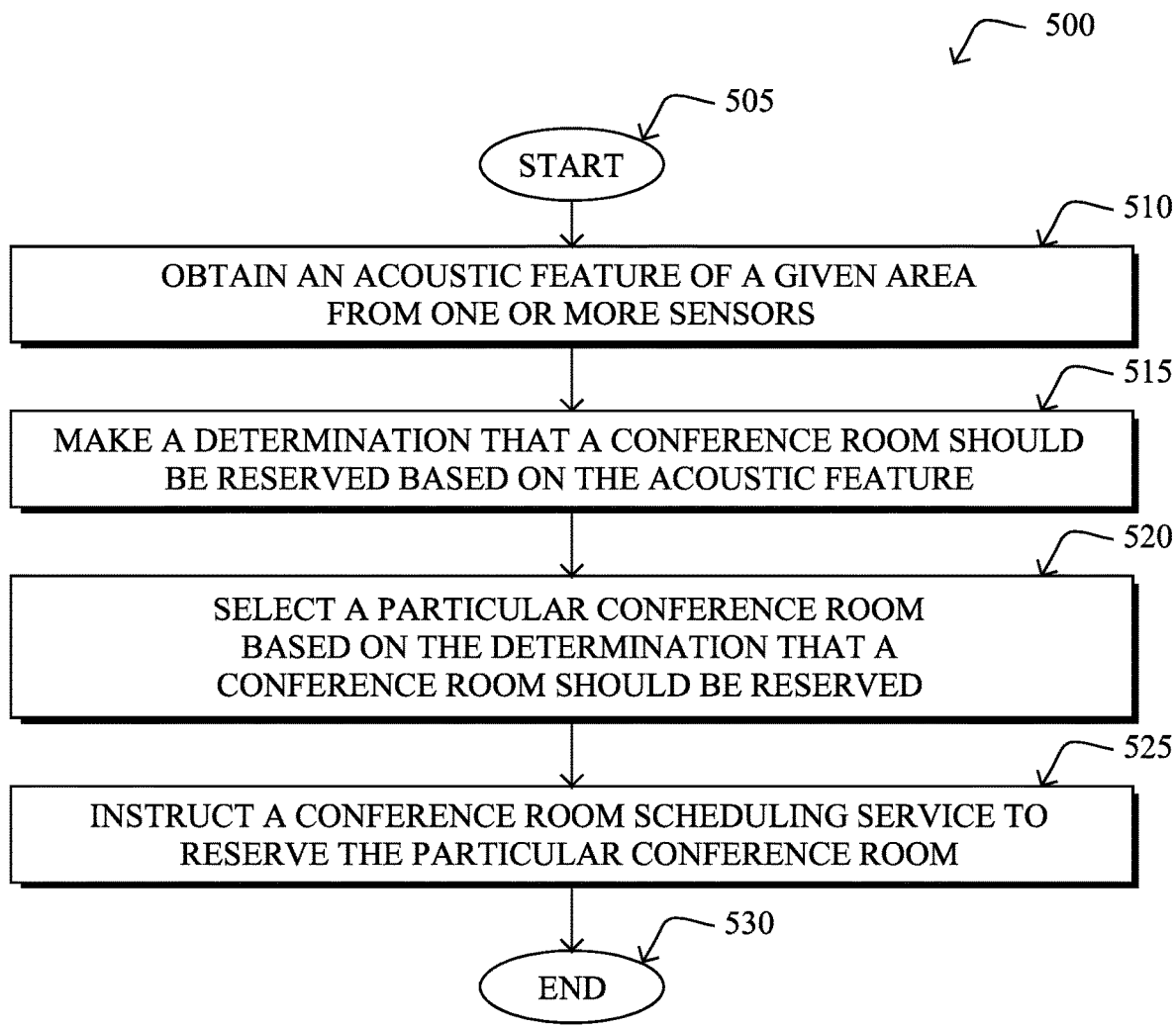
FIG. 5 illustrates an example simplified procedure for room scheduling based on acoustic detection and identification.

FIG. 5 illustrates an example simplified procedure for identification of acoustic features and scheduling alternative meeting spaces in a network in accordance with one or more embodiments described herein. For example, a non-generic, specifically configured device (e.g., device 200) may perform procedure 400 by executing stored instructions (e.g., processes 248 and 249). The procedure 500 may start at step 505 and continue to step 510, where, as described in greater detail above, a supervisory device obtains an acoustic feature of a given area from one or more sensors. The supervisory device may be configured to interact with one or more of the sensors, such as acoustic or visual sensors, that are positioned within the given area and, further may be configured to interact with a conference room scheduling service. In some embodiments, the acoustic feature may include noise or volume level, frequency, length/duration of a sound, sound type, sound location and/or direction, or combinations thereof. Features distinguishing the source of the acoustic feature from white noise or a noise burst (such as a spike in noise level that is non-continuous and/or non-repetitive) may also be included.

In step 515, as described in greater detail above, the supervisory device makes a determination that a conference room should be reserved, based on the acoustic feature obtained from one or more of the sensors. In some embodiments, the supervisory device may determine a relationship between the acoustic feature and a threshold acoustic level, which may be pre-established or variable (such as by time of day). For example, the supervisory device may determine that the acoustic feature, such as sound level or duration, is greater than a pre-determined value, indicating that a conference room should be scheduled in which the source of the disturbance may move.

In step 520, as described in greater detail above, the supervisory device selects a particular conference room based on the determination that a conference room should be reserved. In some embodiments, the supervisory device may receive the location of the source of the disturbance from one or more of the sensors, or may determine the location from the received acoustic feature(s), and the supervisory device may determine the proximity of the source to availability meeting rooms. In some embodiments, the supervisory device may receive or determine the source location based on the acoustic feature and may send the location to a conference room scheduling service for determination of the proximity of the source to available rooms.

In step 525, the supervisory device instructs a conference room scheduling service to reserve the particular conference room. As described in greater detail above, the supervisory device may further provide notification to one or more individuals in the given area that a room has been reserved. The determination as to which user should be notified may be based on identifying characteristics sensed by the one or more sensors using, for example, facial recognition, voice biometrics, and/or position/tagging location techniques. Notification may be made by email using an individual's computer laptop or tablet or by text using accessible mobile devices. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Thus, the techniques described herein provide a system capable of detecting noise and other acoustic disturbances as well as their sources and provide method by which the sources may be removed, away from a productive work environment, before they become excessively distracting. Differentiation between types of noises, and potential actions, is also provided. In particular, loud and/or prolonged conversations can be readily identified and located, and individuals creating the potential, if unintentional, disturbance may be alerted to the problem and notified that an alternative location has been reserved as a place in which their conversation may continue.

While there have been shown and described illustrative embodiments that provide for detecting acoustic disturbances and relocating individuals causing them to an available meeting space, it is to be understood that various other adaptations and modifications may be made within the spirit and scope of the embodiments herein. For example, while certain embodiments are described herein with respect to using certain types of sensors, alone or in fusion, and various systems for determining identifying characteristics, the techniques are not limited as such and other types of sensors or systems may also be used, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, at a processor configured to interact with a plurality of sensors comprising an acoustic sensor and a visual sensor positioned in a given area and with a conference room scheduling service, an acoustic feature of the area from the acoustic sensor and a visual feature of the area from the visual sensor;
   making, by the processor, a determination that a conference room should be reserved based on the acoustic feature;
   in response to making the determination that a conference room should be reserved, selecting, by the processor, a particular conference room based on the visual feature;
   instructing, by the processor, a conference room scheduling service to reserve the particular conference room;
   determining, by the processor, an identity of one or more individuals within the area using at least one of the acoustic feature and the visual feature; and
   sending, by the processor, a notification that the particular conference room has been scheduled to a user device of each of the one or more individuals whose identity is determined using the at least one of the acoustic feature and the visual feature.

2. The method of claim 1, wherein the acoustic feature includes noise level, sound frequency, duration of sound, sound type, location of sound source, or combinations thereof.

3. The method of claim 1, wherein making a determination that a conference room should be reserved comprises:
   determining, by the processor, a relationship between the acoustic feature and a threshold acoustic level.

4. The method of claim 1, wherein selecting a particular conference room comprises:
   detecting, by the processor, a source location based on the acoustic feature; and
   determining, by the processor, proximity of the source location to available conference rooms.

5. The method of claim 1, wherein selecting a particular conference room comprises:
   detecting, by the processor, a source location based on the acoustic feature; and
   sending, by the processor, the source location to the conference room scheduling service for determining proximity of the source location to available conference rooms.

6. The method of claim 1, further comprising; sending, by the processor, instructions to one or more of the visual and acoustic sensors to sense an identifying characteristic of one or more individuals within the area, based on the determination that a conference room should be reserved.

7. An apparatus comprising:
   one or more network interfaces to communicate with a network;
   a processor coupled to the network interfaces and configured to execute one or more processes; and
   a memory configured to store a process executable by the processor, the process when executed configured to:
      obtain an acoustic feature of a given area from an acoustic sensor positioned in the given area;
      obtain a visual feature of the given area from a visual sensor positioned in the given area;
      make a determination that a conference room should be reserved based on the acoustic feature;
      in response to making the determination that a conference room should be reserved, select a particular conference room based on the visual feature;
      instruct a conference room scheduling service to reserve the particular conference room;
      determine an identity of one or more individuals within the area using at least one of the acoustic feature and the visual feature; and send a notification that the particular conference room has been scheduled to a user device of each of the one or more individuals whose identity is determined using the at least one of the acoustic feature and the visual feature.

8. The apparatus of claim 7, wherein the acoustic feature includes noise level, sound frequency, duration of sound, sound type, location of sound source, or combinations thereof.

9. The apparatus of claim 7, wherein the processor makes a determination that a conference room should be reserved by: determining a relationship between the acoustic feature and a threshold acoustic level.

10. The apparatus of claim 7, wherein the processor selects a particular conference room by: detecting a source location based on the acoustic feature; and determining proximity of the source location to available conference rooms.

11. The apparatus of claim 7, wherein the processor selects a particular conference room by: detecting a source location based on the acoustic feature; and sending the source location to the conference room scheduling service for determining proximity of the source location to available conference rooms.

12. The apparatus of claim 7, wherein the process when executed is further operable to: send instructions to one or more of the visual and acoustic sensors to sense an identifying characteristic of one or more individuals within the area, based on the determination that a conference room should be reserved.

13. A tangible, non-transitory, computer-readable media having software encoded thereon, the software when executed by a processor of a supervisory device in a network configured to:
    obtain an acoustic feature of a given area from an acoustic sensor positioned in the given area;
    obtain a visual feature of the given area from a visual sensor positioned in the given area;
    make a determination that a conference room should be reserved based on the acoustic feature;
    in response to making the determination that a conference room should be reserved, select a particular conference room based on the visual feature;
    instruct a conference room scheduling service to reserve the particular conference room;
    determine an identity of one or more individuals within the area using at least one of the acoustic feature and the visual feature; and
    send a notification that the particular conference room has been scheduled to a user device of each of the one or more individuals whose identity is determined using the at least one of the acoustic feature and the visual feature.

14. The computer-readable media of claim 13, wherein making a determination that a conference room should be reserved comprises:
    determining a relationship between the acoustic feature and a threshold acoustic level.

15. The computer-readable media of claim 13, wherein selecting a particular conference room comprises:
    detecting a source location based on the acoustic feature; and
    determining proximity of the source location to available conference rooms.

16. The computer-readable media of claim 13, wherein selecting a particular conference room comprises:
    detecting a source location based on the acoustic feature; and
    sending the source location to the conference room scheduling service for determining proximity of the source location to available conference rooms.

17. The computer-readable media of claim 13, wherein the software when executed is further operable to: send instructions to one or more of the visual and acoustic sensors to sense an identifying characteristic of one or more individual is within the area, based on the determination that a conference room should be reserved.

* * * * *

UNITED STATES PATENT AND TRADEMARK OFFICE
CERTIFICATE OF CORRECTION

PATENT NO. : 10,733,575 B2
APPLICATION NO. : 15/615176
DATED : August 4, 2020
INVENTOR(S) : Hazim Hashim Dahir et al.

Page 1 of 1

It is certified that error appears in the above-identified patent and that said Letters Patent is hereby corrected as shown below:

In the Claims

Column 12, Line 36, please amend as shown:
viduals within the area, based on the determination that a Signed and Sealed this
Eighth Day of December, 2020

Andrei Iancu
*Director of the United States Patent and Trademark Office*